United States Patent
Liao et al.

(10) Patent No.: US 6,434,587 B1
(45) Date of Patent: Aug. 13, 2002

(54) FAST 16-B EARLY TERMINATION IMPLEMENTATION FOR 32-B MULTIPLY-ACCUMULATE UNIT

(75) Inventors: Yuyun Liao, Chandler; David Roberts, Gilbert, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/333,153

(22) Filed: Jun. 14, 1999

(51) Int. Cl.[7] .................................................. G06F 7/52
(52) U.S. Cl. ......................................... 708/629; 708/628
(58) Field of Search ................................. 708/629, 628, 708/632, 523, 501

(56) References Cited

U.S. PATENT DOCUMENTS

| | | | |
|---|---|---|---|
| 4,965,762 A | * 10/1990 | Williams | 708/628 |
| 5,150,322 A | * 9/1992 | Smith et al. | 708/628 |
| 5,220,525 A | * 6/1993 | Anderson et al. | 708/632 |
| 5,444,647 A | 8/1995 | Komoda | 708/650 |
| 5,465,226 A | 11/1995 | Goto | 708/625 |
| 5,548,709 A | 8/1996 | Hannah et al. | 345/552 |
| 5,619,440 A | 4/1997 | Komoda | 708/620 |
| 5,684,731 A | * 11/1997 | Davis | 708/629 |
| 5,706,481 A | 1/1998 | Hannah et al. | 345/519 |
| 5,751,619 A | * 5/1998 | Agarwal et al. | 708/629 |
| 5,847,981 A | * 12/1998 | Kelly et al. | 708/632 |
| 5,867,415 A | 2/1999 | Makino | 708/629 |
| 5,943,250 A | * 8/1999 | Kim et al. | 708/629 |
| 5,944,776 A | * 8/1999 | Zhang et al. | 708/629 |
| 6,035,318 A | * 3/2000 | Abdallah et al. | 708/628 |

* cited by examiner

Primary Examiner—David H. Malzahn
(74) Attorney, Agent, or Firm—Blakely, Sokoloff, Taylor & Zafman LLP (57) ABSTRACT

An embodiment of the present invention is a mixed length encoding unit. The mixed length may be a 12/16 bits (12/16-b) encoding algorithm within a multiply-accumulate (MAC). The mixed length encoding unit includes 16-b Booth encoder adapted to produce eight partial product vectors from sixteen bits of data. The 16-b Booth encoder is coupled to a four stage Wallace Tree. During a first cycle of the invention, a multiplex system directs the eight partial products and an accumulation vector to a four stage Wallace Tree. During subsequent cycles, the multiplex system directs six partial product vectors, an accumulation vector, one carry-feedback input vector, and one sum-feedback input vector to the four stage Wallace Tree.

20 Claims, 14 Drawing Sheets

**FIXED 12-BIT ENCODING
SCHEME'S CLA BIT PATTERN**

| BIT(N) | BIT(N-1) | • • • | BIT(1) | BIT(0) |
|---|---|---|---|---|
| S | S | • • • | S | S |
| C | C | • • • | C | 0 |
| CARRY IN FROM BIT(N-1) | CARRY IN FROM BIT(N-2) | • • • | CARRY IN FROM BIT(0) | 0 |

FROM FIG. 11A

| BIT(N) | BIT(N-1) | ... | BIT(1) | BIT(0) |
|---|---|---|---|---|
| S | S | ... | S | S |
| C | C | ... | C | 0 |
| CARRY IN FROM BIT(N-1) | CARRY IN FROM BIT(N-2) | ... | CARRY IN FROM BIT(0) | 0 |

FIXED 16-BIT ENCODING SCHEME'S CLA BIT PATTERN

LEGEND:

| P | PARTIAL PRODUCT BIT | A | ACCUMULATE DATA BIT |
|---|---|---|---|
| C | CARRY BIT | X | 2'S COMP. ADJ. BIT |
| S | SUM BIT | | |

MIXED 12/16-B ENCODING SCHEME'S CSA WALLACE TREE BIT PATTERN AND EMBODIMENT OF 2'S COMPLEMENT ADJUSTMENT BITS

LEGEND:
| P | PARTIAL PRODUCT BIT | P/S | PARTIAL PRODUCT OR SUM BIT |
|---|---|---|---|
| C | CARRY BIT | P/C | PARTIAL PRODUCT OR CARRY BIT |
| S | SUM BIT | | |
| A | ACCUMULATE DATA BIT | | |
| X | 2'S COMP. ADJ. BIT | | |

FAST 16-B EARLY TERMINATION IMPLEMENTATION FOR 32-B MULTIPLY-ACCUMULATE UNIT

BACKGROUND OF THE INVENTION

1. Field of the Invention

The invention relates to digital signal processing that embeds mixed length encoding schemes within multiply-accumulate (MAC) architecture. More particularly, the invention preferably relates to mixed length 12/16 bits (12/16-b) encoding algorithms within MACs.

2. Background Information

Electronic products may be thought of as those products that involve the controlled conduction of electrons or other charge carriers, especially through microprocessors. Just about all electronic products employ microprocessors. These microprocessors employ arithmetic blocks that process signals of data such as digital data. As the demand for higher performing microprocessors increases, the demand for higher speed arithmetic blocks used in these microprocessors increases. For example, clock cycle frequencies of one gigahertz (GHz) require large, computational power for which arithmetic blocks may keep pace.

Conventional digital signal processing (DSP) generally involves processing a digital signal having thirty-two bits of data or information. A single bit of data is represented by a zero or a one. Part of processing these thirty-two bits (32-b) involves passing them through a series of multiplications and/or accumulations (which can be thought of as adders) to generate a single output vector as a final result. Mathematically, this multiplication and addition of bits may be represented as A*B+C=S1, where vector A may be a thirty-two bit multiplicand, vector B may be a thirty-two bit multiplier, and vector C may be a thirty-two bit accumulated data, where the solution may be sent to storage S1.

Latency is the time between the start of processing a signal and the completion of that signal processing. Throughput is the total capability of equipment to process data during a specified time period. High performance involves low latency and high throughput. The series of multiplications and/or accumulations have a large influence over the latency and throughput of the entire DSP application. Thus, multiplications and/or accumulations with low latency and high throughput are desirable.

A unit of the above series is known as a multiply-accumulate unit (MAC). For thirty-two bits of data, there are two methods that are available and widely used to implement 32-b MACs. The first method is a fixed length, twelve-bit (12-b) Booth encoding algorithm for multiplication. A 12-b Booth encoding algorithm is fixed when it encodes twelve bits during each clock cycle. The second method is a fixed length, sixteen-bit (16-b) Booth encoding algorithm for multiplication. A 16-b Booth encoding algorithm is fixed when it encodes sixteen bits during each clock cycle.

A high throughput MAC is a key element to achieving high digital signal processing performance. For a MAC, the latency and throughput depend on the number of multiplier bits encoded during each clock cycle. The greater the number of encoded multiplier bits processed per cycle, the higher the throughput.

Conventionally, the method of implementing the above 12-b and 16-b MACs involves two basic steps. First, create a group of partial products. Then, add these partial products together to produce the final product. In comparing a 12-b encoding scheme with a 16-b encoding scheme, the main advantage of the 12-b encoding scheme is that its Wallace Tree is about 25% faster than that of the 16-b encoding scheme. However, the 12-b encoding scheme needs two cycles to create the final sum and carry vectors for 16-b singled digital signal process (DSP) applications whereas the 16-b encoding scheme needs only one cycle.

Although conventional digital signal processing generally involves processing a digital signal having thirty-two bits of data, some digital signal processing applications process digital signals having only sixteen bits of data. Portable electronic products, for example, typically receive information in strings of sixteen bits. These 16-b DSP applications include products such as portable radios, televisions, and camera recorders. Because they are portable, low power designs for the microprocessors of portable electronic products are desirable. What is needed is a high performance, low power MAC implementation with enhanced DSP features that overcomes these two drawbacks without losing the desirable low power characteristic.

SUMMARY OF THE INVENTION

Embodiments of the present invention include a mixed length encoding unit. The mixed length may be a 12/16 bit (12/16-b) encoding algorithm within a multiply-accumulate (MAC). The mixed length encoding unit includes 16-b Booth encoder adapted to produce eight partial product vectors from sixteen bits of data. The 16-b Booth encoder is coupled to a four stage Wallace Tree. During a first cycle of the invention, a multiplex system directs the eight partial products and an accumulation vector to a four stage Wallace Tree. During subsequent cycles, the multiplex system directs six partial product vectors, an accumulation vector, one carry-feedback input vector, and one sum-feedback input vector to the four stage Wallace Tree.

DETAILED DESCRIPTION OF THE INVENTION

The invention relates to mixed length 12/16 bits (12/16-b) encoding algorithms within a multiply-accumulate (MAC)

architecture. In conventional 16-b encoding, eight partial product vectors are directed to a five stage carry save adder (CSA) Wallace Tree. However, during the first clock cycle of either the 12-b or 16-b encoding, the two feedback vectors of carry and sum are always zero or can be zeroed out since they do not add anything to the first compression cycle of the Wallace Tree. The invention takes advantage of this and the low latency of a four stage CSA Wallace Tree by directing eight partial products to a four stage CSA Wallace Tree during the first clock cycle. By mixing the advantages of the 16-b encoding scheme with the much faster four stage Wallace Tree of the 12-b encoding scheme, the invention dramatically increases the performance of microprocessors within electronic products that typically receive information in strings of sixteen bits. In this way, an embodiment of the invention is fast enough to process Digital Signal Processing (DSP) algorithms so that electronic product designers need not add the cost of an extra DSP engine to their product to speed up the DSP algorithms.

In operation, an embodiment of the invention encodes sixteen bits of the multiplier in the first cycle and encodes twelve bits of the multiplier for the rest of the cycles. Eight partial product vectors may be generated by the multiplier in the first cycle. Along with the one accumulate data vector, the eight partial product vectors fill the nine slots of a four stage CSA Wallace Tree. For the remaining cycles, six partial product vectors may be encoded by the multiplier. The six partial product vectors are matched with two feedback vectors (carry and sum) and the one accumulate data vector to fill in the nine slots.

Figure 1:
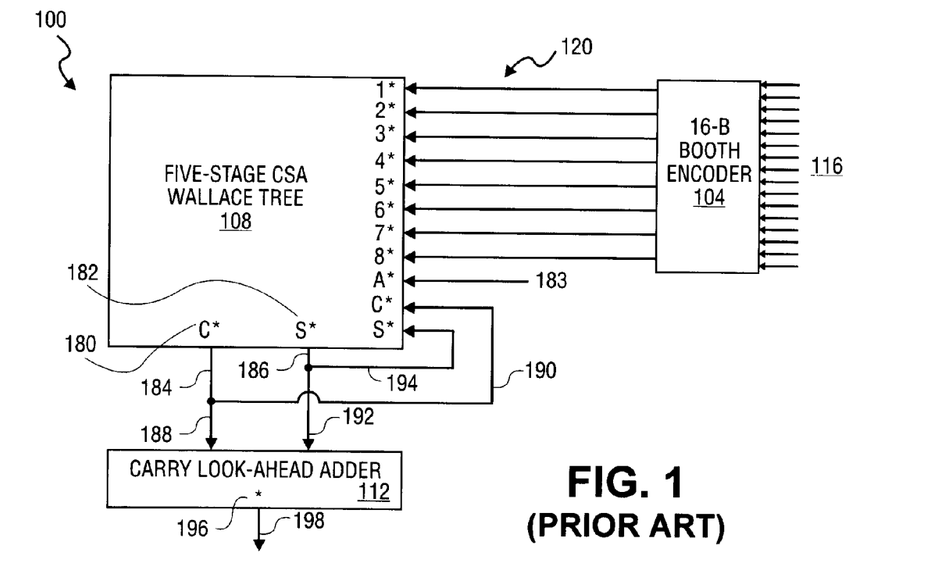
FIG. 1 illustrates a fixed 16-b Booth encoding algorithm.

FIG. 1 illustrates a fixed 16-b Booth encoding algorithm and is identified as fixed 16-b encoding 100. The method of implementing fixed 16-b encoding 100 involves creating a group of partial product vectors such as partial product vectors 120 and then adding them up to produce the final product, such as final vector 196. To accomplish this, Booth encoder 104 may be coupled to five-stage Wallace Tree 108, where five-stage Wallace Tree 108 may be coupled to carry look-ahead adder (CLA) 112. CLA 112 may be coupled to a register file (RF) (not shown) or storage (S) (not shown). Thirty-two bits of data are conventionally grouped into three sets of sixteen bits of data for processing in a fixed 16-b encoding. The first set and the second set have one bit overlapped, and the second and third set have one bit overlapped wherein the third set may contain bit thirty-one and fifteen sign extensions. Overall, data or information 116 comprising sixteen bits enters fixed 16-b encoding 100 at Booth encoder 104 and thirty-two bits of information leaves CLA 112 as result vector 196.

All multiplication methods share the same basic procedure: addition of a number of partial product vectors. To obtain the two vectors (sum and carry) that are to be added, Booth encoding 104 receives sixteen bits of information 116 and outputs eight partial product vectors 120 by known methods. Preferably, a method known as Modified Booth's Algorithm is used. Modified Booth's Algorithm reduces the number of partial products by a factor of two, without requiring a preadd to produce the partial products.

Five stage CSA Wallace Tree 108 receives at its eleven inputs the eight partial products 120, shown in FIG. 1 as "1*" through "8*", carry vector 190 ("c*"), sum vector 194 ("s*"), and accumulator vector 183. Carry vector 190 and sum vector 194 have primary application during the second and subsequent cycles. During the first cycle of fixed 16-b encoding 100, carry vector 190 and sum vector 194 are zero.

Accumulate vector 183 may be an independent value that typically may be added as a fixed offset value. Accumulate vector 183 may be accounted for because the accumulate vector may be part of the ARM architecture. Thus, a total of eleven vectors need to be processed by five stage Wallace Tree 108 as received at the eleven inputs of five stage Wallace Tree 108. The process of the eleven vectors by five stage Wallace Tree 108 may be best understood as illustrated by a carry save adder (CSA) tree.

Figure 2:
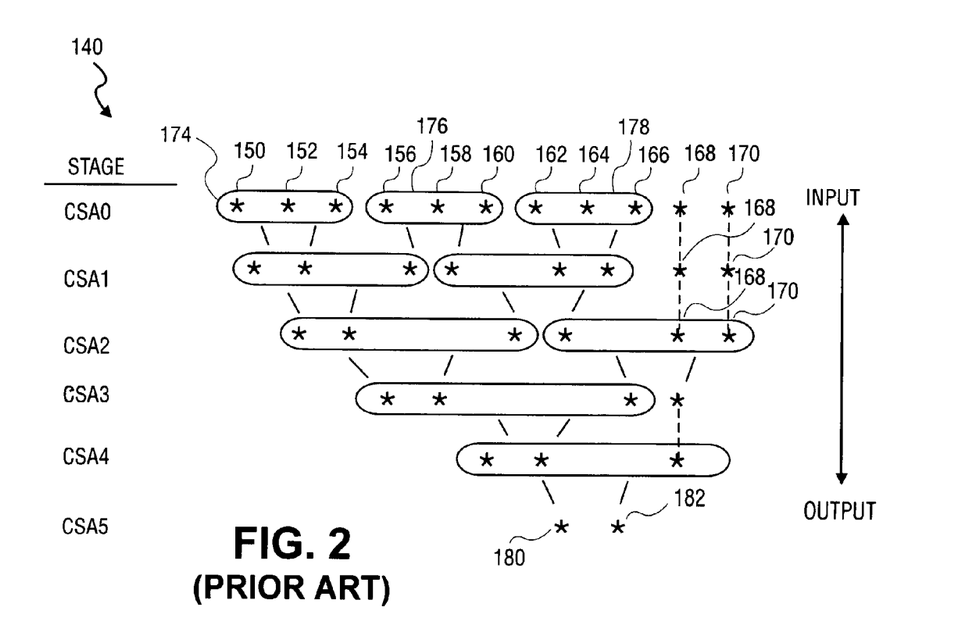
FIG. 2 illustrates a CSA tree for a five-stage, 3 to 2 Wallace Tree.

FIG. 2 illustrates CSA tree 140 for five-stage, 3 to 2 Wallace Tree 108. A 3 to 2 CSA may reduce or compress three vectors to two vectors for each of the five stages of a given cycle. At the first stage, CSA0, five stage Wallace Tree 108 (FIG. 1) receives eleven vectors, shown in FIG. 2 as a "*" character. Five stage Wallace Tree 108 arranges vectors 150 to 170 into groups of three: 174, 176, and 178 shown in FIG. 2. The remaining two vectors at stage CSA0, vector 168 and vector 170, remain ungrouped since there is not a third vector with which to group them. Vector 168 and vector 170 are brought forward to the next CSA stage.

On moving to the second stage CSA1, the three vectors within each of vector groups 174, 176, and 178 are reduced by the 3 to 2 CSA from three vectors to two vectors. Similar to stage CSA0, the realm of vectors at stage CSA1 are arranged into groups of three and reduced to two vectors. Since vector 168 and vector 170 remain ungrouped at stage CSA1, they are carried forward to the next CSA stage. At stages CAS2, CSA3, and CSA4, the vectors are group and reduced or carried forward if ungrouped. At stage CSA5, the 3 to 2 CSA has completed its task of reducing vector 150 through vector 170 to the two vectors of carry vector 180 and sum vector 182 shown in FIG. 2.

Referring back to FIG. 1, five-stage Wallace Tree 108 distributes carry vector 180 to bus 184 and sum vector 182 to bus 186. The resulting change in the value of carry vector 180 and sum vector 182 may need to be added to the subsequent cycle. Thus, bus 184 splits off into bus 188 which may be the lower 16-b of carry vector 180 and bus 190 which may be the upper bits of carry vector 180 while bus 186 splits off into bus 192 which may be the lower 16-b of sum vector 182 and bus 194 which may be the upper bits of sum vector 182. Bus 188 may be coupled to carry look-ahead adder (CLA) 112 and bus 190 returns to five-stage Wallace Tree 108. Similarly, bus 192 may be coupled to CLA 112 and bus 194 returns to five-stage Wallace Tree 108.

During each cycle, carry vector 180 and sum vector 182 are distributed to CLA 112. A carry look-ahead adder may be an adder for two vectors (2 compressed to 1) whereas a CSA may be an adder for three vectors (3 compressed to 2 per stage). CLA 112 compresses carry vector 188 and sum vector 192 to a single vector, shown in FIG. 1 as result vector 196. Result vector 196 may be distributed to, for example, storage, through bus 198.

For thirty-two bits of data, it takes fixed 16-b encoding 100 two cycles for fixed 16-b encoding 100 to process the thirty-two bits. Since there may be one overlapped bit between two cycles, a third cycle may be needed to process bit 31 padded with leading zeros for unsigned multiplications. During the first cycle, there are no processed vectors to return on bus 190 and bus 194 to five stage Wallace Tree 108. The vectors at position C* and S* of five stage Wallace Tree 108 do not form any part of the sixteen bits of data input at the upstream side of 16-b Booth encoder 104, and thus play no part during the first cycle of fixed 16-b encoding 100. The throughput for a fixed length, sixteen bit (16-b) Booth encoding is known. The invention takes advantage of the high throughput of 16-b Booth encoder 104 within a fixed length, sixteen bit (16-b) Booth encoding as discussed below.

Figure 3:
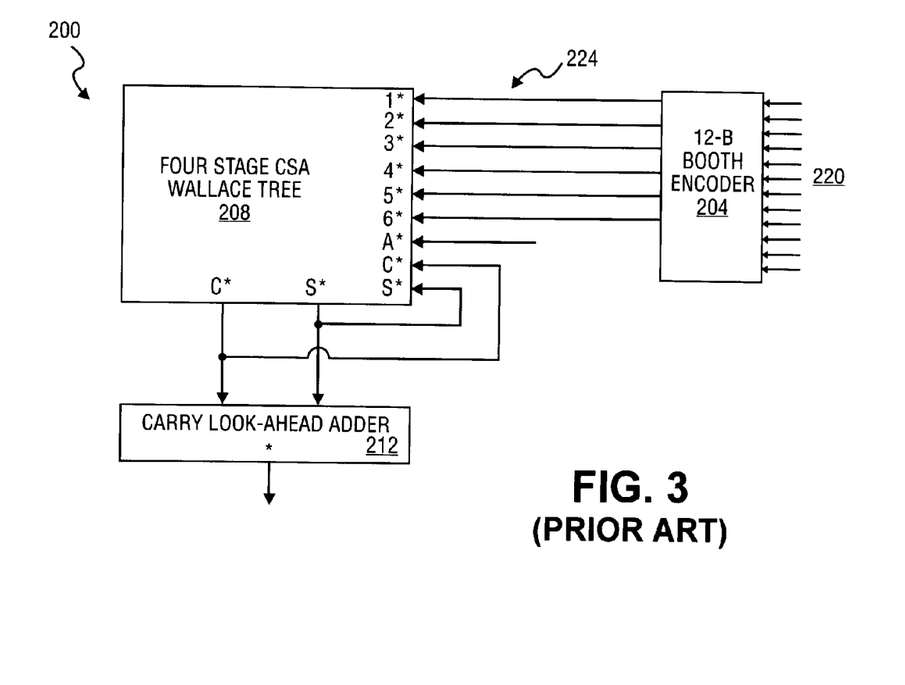
FIG. 3 illustrates a fixed 12-b Booth encoding algorithm.
Figure 4:
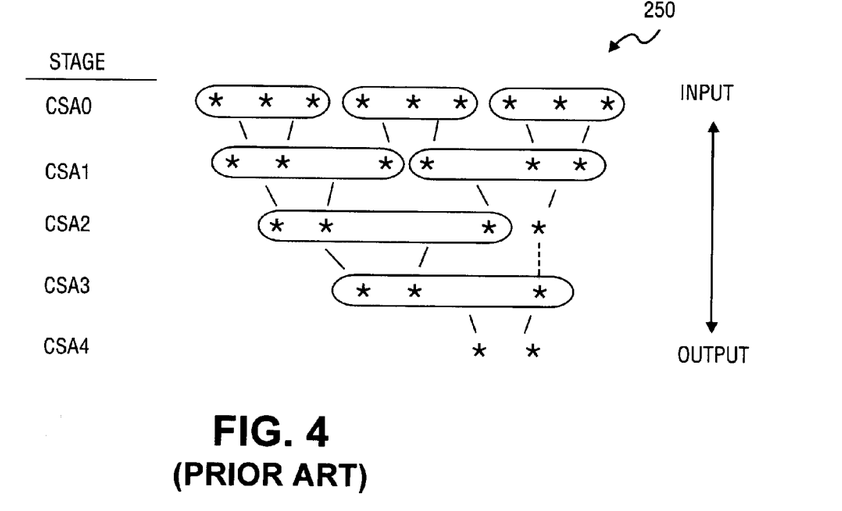
FIG. 4 illustrates a CSA tree for a four-stage Wallace Tree.

FIG. 3 illustrates a fixed 12-b Booth encoding algorithm and may be identified as fixed 12-b encoding 200. Fixed 12-b encoding 200 may have 12-b Booth encoder 204, four stage, 3 to 2 CSA Wallace Tree 208, and CLA 212. FIG. 4 illustrates CSA tree 250 for four-stage Wallace Tree 208. Thirty-two bits of data are conventionally grouped into three sets of twelve bits of data for processing in a fixed 12-b encoding for a total of thirty-six bits of data. The additional four bits of data in the third set may be sign extensions.

Fixed 12-b encoding 200 operates similarly to fixed 16-b encoding 100. Bits 220 enter 12-b Booth encoder 204 and are reduced to partial products 224. In the case of fixed 12-b encoding 200, only twelve bits of data are processed during each cycle as compared to sixteen bits of data for fixed 16 b encoding 100. Thus, twelve bits 220 are encoded to create six partial product vectors 224. These six partial product vectors are transferred to four stage Wallace Tree 208 and processed in four stages.

Each stage of a Wallace Tree takes approximately the same amount of delay time whether in a four stage or a five stage configuration. Processing bits of information in four stages is theoretically 20% quicker than processing bits of information in five stages [=(1−4/5)*100%]. In practice the Wallace Tree of a 12-b encoding scheme may be about 25% faster than that of the Wallace Tree of a 16-b encoding scheme. The delay time for a fixed length, twelve bit (12-b) Booth encoding is known. The invention takes advantage of the low delay time of the four stage Wallace Tree within a fixed length, twelve bit (12-b) Booth encoding as discussed below.

It takes two cycles for fixed 12-b encoding 200 to process sixteen bits of information whereas it takes only one cycle for fixed 16-b encoding 100 to process sixteen bits of information. The invention takes advantage of the high throughput of 16-b Booth encoder 204 as shown in FIG. 1 and the low delay time of the four stage Wallace Tree as shown in FIG. 3 by coupling signal switches between a 16-b Booth encoder to a four stage Wallace Tree. This is illustrated in FIG. 5.

Figure 5:
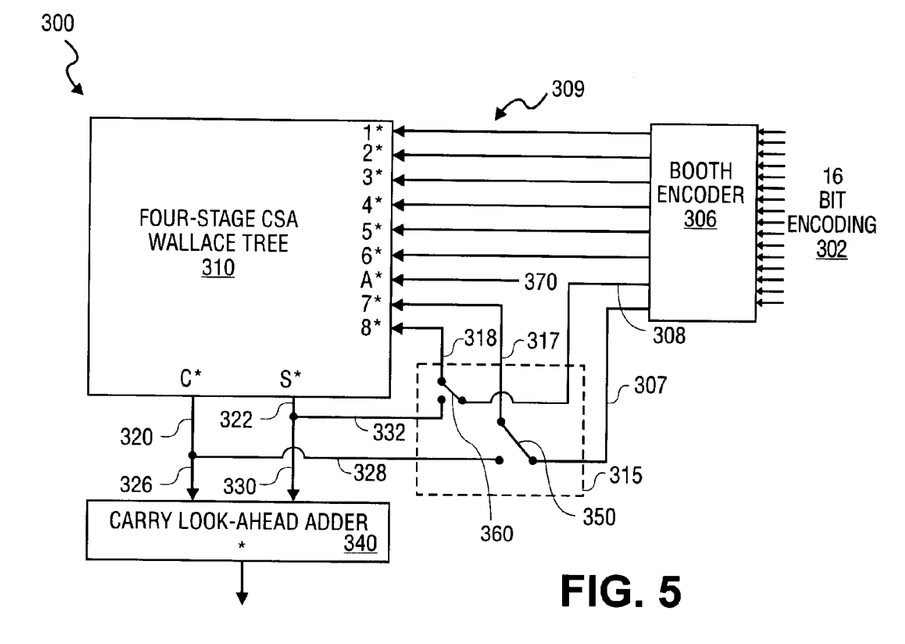
FIG. 5 illustrates the first cycle of a mixed 12/16-b encoding.

FIG. 5 illustrates the first cycle of mixed 12/16-b encoding 300. To process 32 bits of data, three cycles of mixed 12/16-b encoding 300 may be used. However, for some portable electronic products that process information strings of only sixteen bits of data, only one cycle of mixed 12/16-b encoding 300 may be used.

As shown in FIG. 5, Booth encoder 306 may be coupled to Wallace Tree 310 through a plurality of buses, including bus 309, bus 307 and bus 308. Bus 307 and bus 308 are directed from Booth encoder 306 into multiplex system 315. Switch box or multiplex system 315 may be coupled to Wallace Tree 310 through bus 317 and bus 318 and may be capable of switching signal paths between at least one output bus and at least two input buses. Wallace Tree 310 also receives accumulation bus 370.

Wallace Tree 310 may be a four stage, 3 to 2 CSA Wallace Tree. Having nine inputs, Wallace Tree 310 may have two output buses, carry vector bus 320 and sum carry vector bus 322. Bus 320 splits off into bus 326 and bus 328 while bus 322 splits off into bus 330 and bus 332. Bus 326 and bus 330 are coupled to carry look-ahead adder (CLA) 340.

Bus 328 may be directed into multiplex system 315 so as to compete with bus 307 for the attention of bus 317 through switch 350. Similarly, switch 360 couples bus 332, bus 308 and bus 318 together. Thus, bus 328 and bus 332 serve as feedback slots.

During the first cycle of operation, Booth encoder 306 receives data bits 302 in a string of sixteen encoding data bits. These sixteen bits are converted to eight partial product vectors. With switch 350 and switch 360 positioned to complete the paths of bus 307 and bus 308 to Wallace Tree 310, the eight partial product vectors are communicated to Wallace Tree 310 through the six lines of bus 309, bus 307, and bus 308. Along with an accumulation vector on accumulator bus 370, the nine partial products may be processed by four stage Wallace Tree 310 as described in connection with FIG. 4.

If after the first cycle the remaining bits to be processed are all ones or all zeros, then the results of further cycles may not change the overall results. The invention recognizes such results by known techniques and terminates the multiply early.

Figure 6:
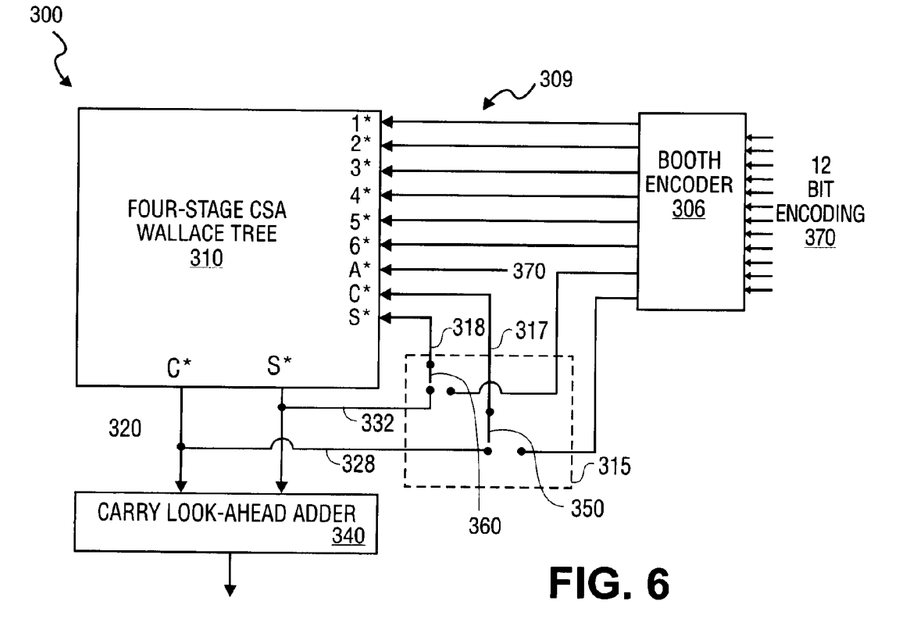
FIG. 6 illustrates a second cycle of a mixed 12/16-b encoding.

FIG. 6 illustrates a second cycle of mixed 12/16-b encoding 300. During the second cycle, switch 350 and switch 360 are positioned to complete the paths of bus 328 and bus 332 to Wallace Tree 310 so that Wallace Tree 310 may receive any carry vector ("C*") or sum vector ("s*") developed during the previous cycle. With two less partial product paths between Booth encoder 306 and Wallace Tree 310, Booth encoder 306 receives twelve bits of data 370 and reduces them down to six partial product vectors. These six partial product vectors are transmitted to Wallace Tree 310 over bus 309 to be compressed with an accumulation vector on bus 370 and any carry vector ("C*") or sum vector ("s*") distributed to Wallace Tree 310 over bus 317 and bus 318, respectively. After the second cycle, twenty eight bits may have been encoded.

Figure 7:
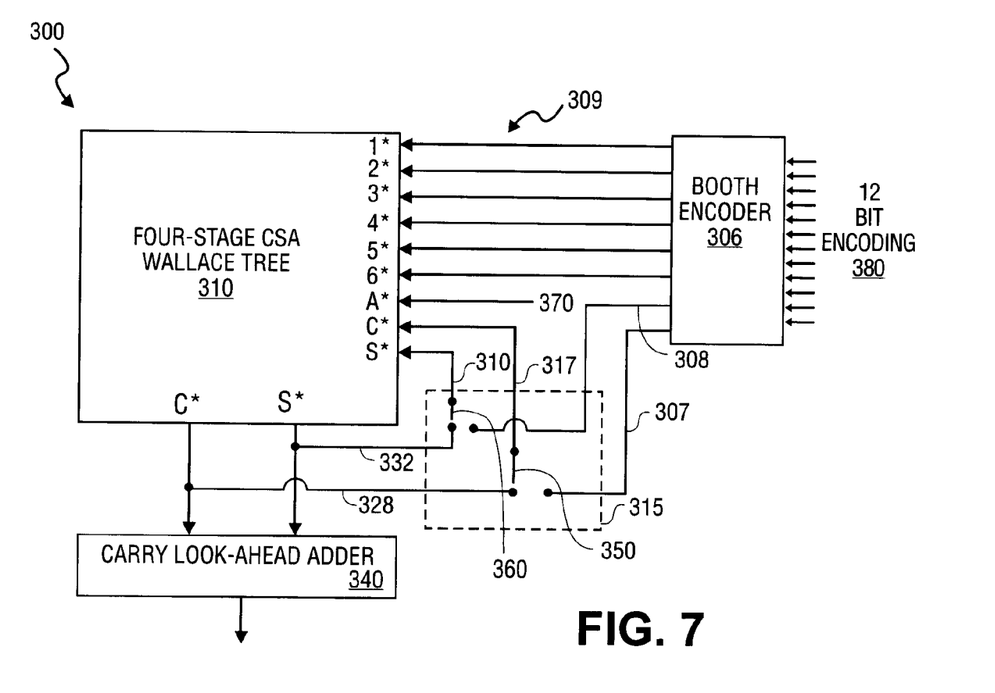
FIG. 7 illustrates a third cycle of a mixed 12/16-b encoding.

FIG. 7 illustrates a third cycle of mixed 12/16-b encoding 300. Similar to the second cycle shown in FIG. 6, switch 350 and switch 360 may be positioned to complete the paths of bus 328 and bus 332 to Wallace Tree 310 so that Wallace Tree 310 may receive any carry vector ("C*") or sum vector ("s*") developed during the previous cycle. In the third cycle, eight sign extension bits may be added to the four remaining bits to be encoded. This ensures that each input of Wallace Tree 310 receives a partial product vector.

Figure 8:
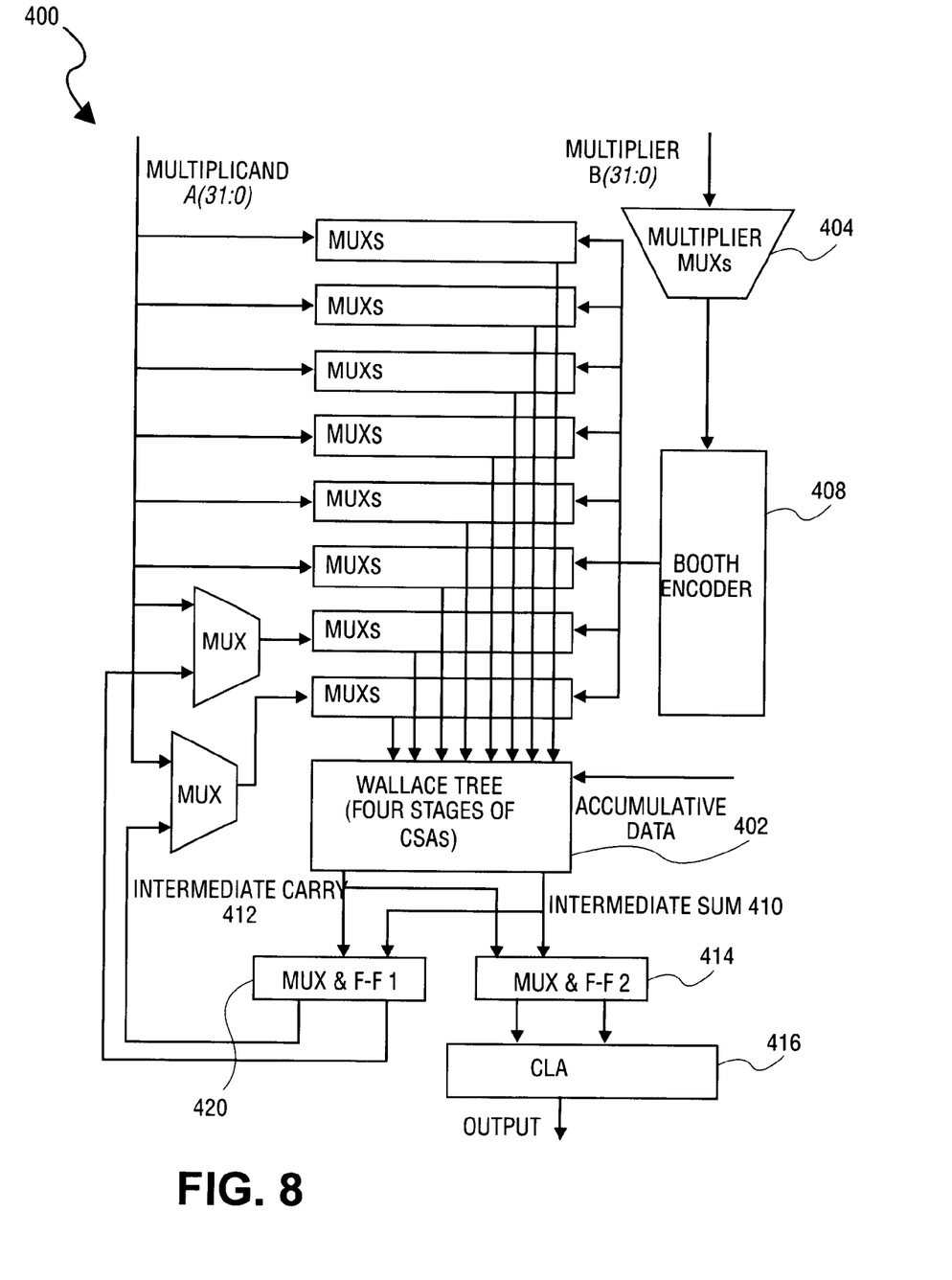
FIG. 8 is an embodiment of the fast mixed length encoding scheme.

FIG. 8 is an embodiment of fast mixed length encoding scheme 400. As illustrated, Wallace Tree 402 contains four stages of three to two CSAs. Vector A[31:0] may be a thirty-two bit multiplicand and vector B[31:0] be a thirty-two bit multiplier. The new implementation's flow may be as follows.

Cycle 0

Multiplier MUXs 404 selects B[15:0] and sends B[15:0] to the Booth encoder 408. Booth encoder 408 generates the control signals. Each of these control signals will select a partial product vector from the set {0, −A, −2A, A, 2A}. Eight partial product vectors may be generated. All the selected partial product vectors are sent to Wallace Tree 402. Wallace Tree 402 then creates intermediate sum vector 410 and intermediate carry vector 412. Here, the values of B[31:16] may be any combination of zeros or ones.

a) If B[31:16] are all zeros or ones, the lower thirty-two bits of intermediate sum vector 410 and intermediate carry vector 412 are sent to CLA 416 via MUX & F-F two 414. If a 32-b operation may be used, Wallace Tree 402 may be available to accept a new MAC instruction in the next cycle. If a 64-b result is required, then the remaining intermediate sum vector 410 and intermediate carry vector 412, along with the extension bits, are sent back to Wallace Tree 402 via MUX & F-F one 420 for use during the operation of Cycle 1.

b) If B[31:16] are not all zeros or ones, the lower Sixteen bits of intermediate sum vector 410 and intermediate carry vector 412 are sent to CLA 416 via MUX & F-F two 414. The remaining bits associated with intermediate sum vector 410 and intermediate carry vector 412, including the extension bits, are sent back to Wallace Tree 402 via MUX & F-F one 420 for use during the operation of Cycle 1.

Cycle 1

During Cycle 1, B[27:16] are sent to Booth encoder 408 where six control signals will be generated by Booth encoder 408. Each of these control signals will select a partial product vector from the set {0, –A, –2A, A, 2A}. Six partial product vectors will be generated. The six selected partial vectors along with the two intermediate sum and carry vectors from Cycle 0 are sent to Wallace Tree 402. New intermediate sum and intermediate carry vectors will then be created from Wallace Tree 402. Here, B[31:28] may all be zeros or ones or B[31:28] may not be all zeros or ones.

a) If B[31:28] are all zeros or ones, the lower sixteen bits of intermediate sum vector 410 and intermediate carry vector 412 are sent to CLA 416 via MUX & F-F two 414. If a 32-b result is needed, Wallace Tree 402 is available to accept a new MAC instruction on the next cycle. Otherwise intermediate sum vector 410 and intermediate carry vector 412 containing the sign extension bits are sent back to Wallace Tree 402 via MUX & F-F one 420 for use during the operation of Cycle 2.

b) If B[31:28] are not all zeros or ones, the lower twelve bits of intermediate sum vector 410 and intermediate carry vector 412 are sent to CLA 416 via MUX & F-F two 414. The remaining bits with the extension bits are sent back to Wallace Tree 402 via the MUX & F-F one 420 for use during the operation of Cycle 2.

Cycle 2

During Cycle 2, B[31:28] and eight extension bits are sent to Booth encoder 408. Booth encoder 408 generates six control signals. Each of these control signals will select a partial product vector from the set {0, –A, –2A, A, 2A}. These six partial product vectors and intermediate sum vector 410 and intermediate carry vector 412 from Cycle 1 are sent to Wallace Tree 402. New intermediate sum and carry vectors will then be generated. These new intermediate sum and carry vectors are then sent to CLA 416 via MUX & F-F two 414 to create the final result. Wallace Tree 402 is now available to accept a new MAC instruction on the next cycle.

In real-time DSP systems, many applications (such as handwriting recognition, voice recognition, and speech synthesis) require 16-b MAC operations. Offering a high performance for these 16-b DSP applications may be considered as a big competitive advantage in the embedded application market. For ARM Version 5 architecture, see *ARM Architecture Reference Manual, Advanced RISC Machines*, Lt., Cambridge, U.K. 1996. These 16-b DSP extensions include a Single Instruction Multiple Data (SIMD) format and a Multiply with Implicit Accumulate (MIA).

To meet the high throughput requirements of many advanced DSP applications, a mixed 12/16-b multiply-accumulate unit has been designed. The high throughput rate may be achieved by using a new encoding scheme and a new MAC architecture with the enhanced DSP features.

Figure 9:
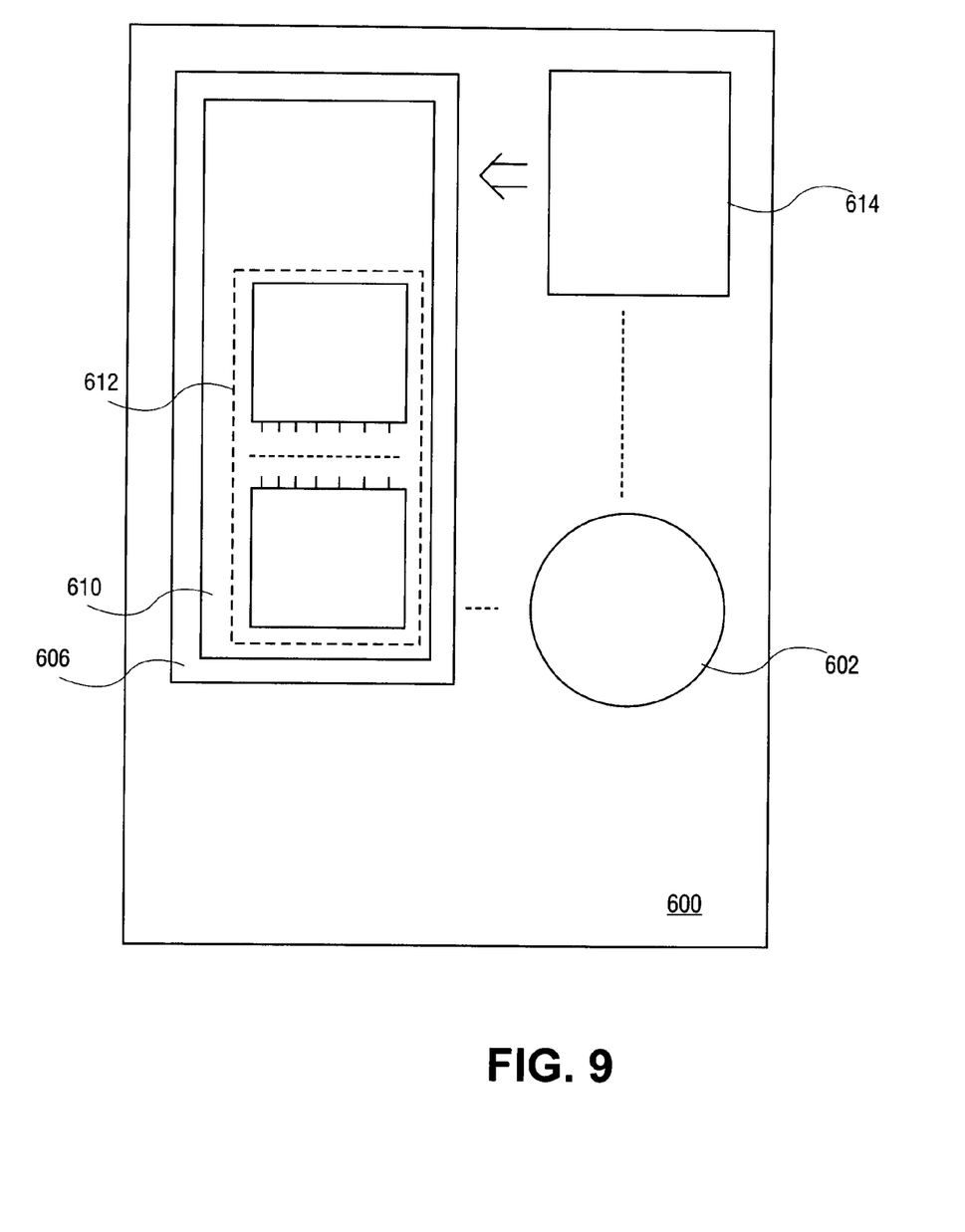
FIG. 9 illustrates a portable electronic product implementing the invention.

FIG. 9 illustrates portable electronic product 600 implementing the invention. Portable electronic product 600 includes power source 602, microprocessor 606 coupled to power source 602 and multiply-accumulate unit 610 disposed within the microprocessor. Preferably, multiply-accumulate unit 610 includes mixed length encoding unit 612 such as herein described. Coupled to power source 602 and microprocessor 606 may be digital signal processing engine 614.

In applying mixed bit encoding such as mixed twelve/sixteen bit encoding to a four stage Wallace Tree, the 2's compliment adjustment bit includes an extra two that needs to be accounted for. Conventionally, there are six positions for the 2's compliment adjustment bit. In an embodiment of mixed encoding, the 12/16-b encoding requires eight positions to match the eight partial products.

Figure 10A:
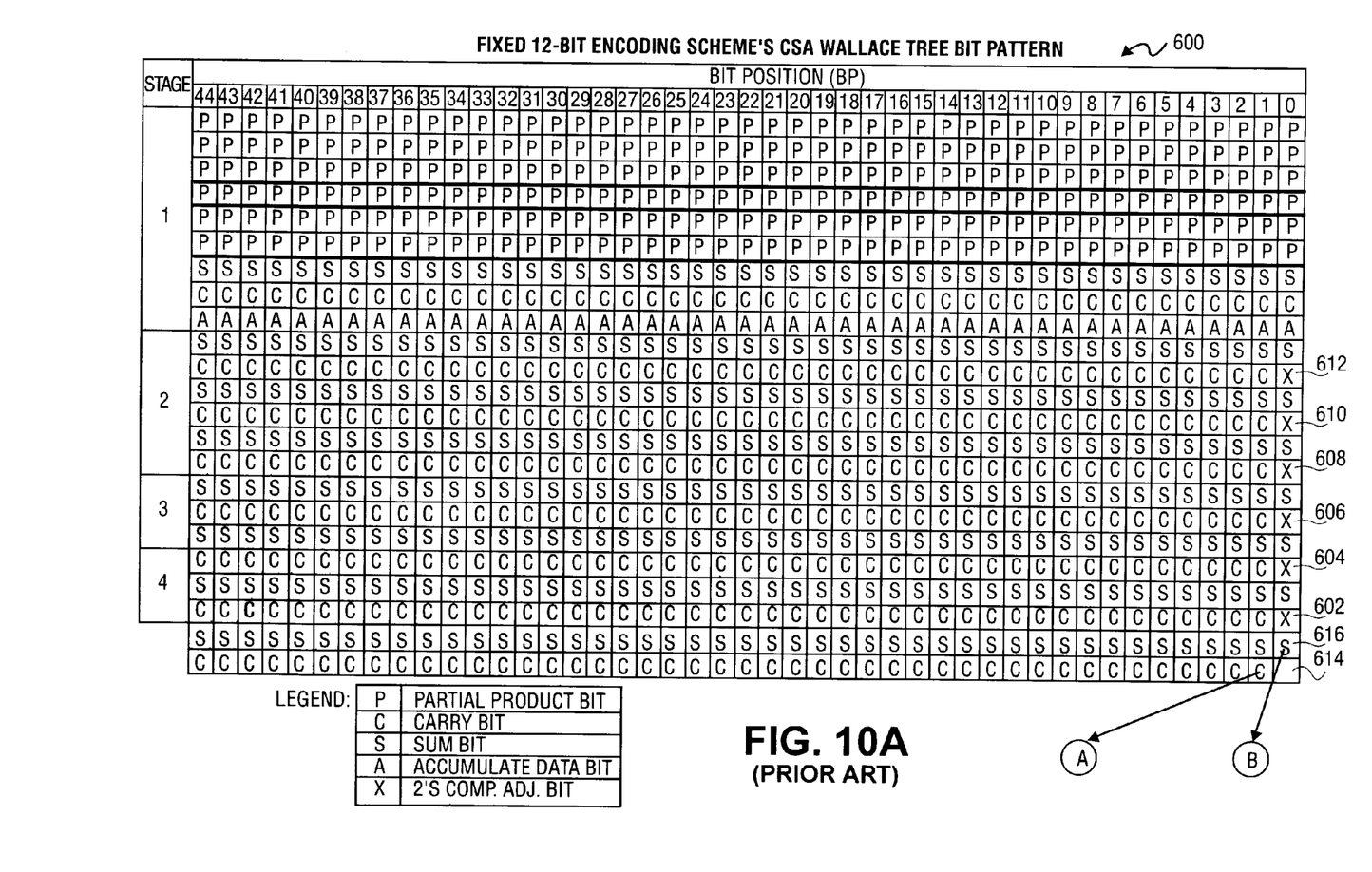
FIG. 10 illustrates a conventional fixed 12-b Wallace Tree bit pattern.
Figure 10B:
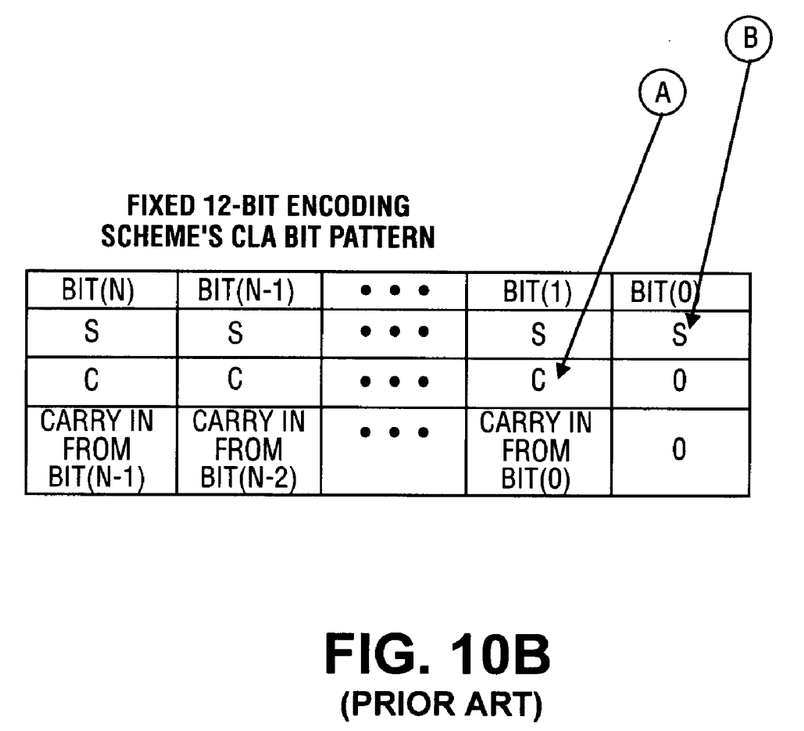

FIG. 10 illustrates a conventional fixed 12-b Wallace Tree bit pattern. As shown, the six twos compliment adjusting bits fit into bit zero of the intermediate carry vectors. These are shown as X's 602 to 612. Box 614 holds the carry bit and box 616 holds the sum bit. These two are inputs to the carry look ahead adder.

Figure 11A:
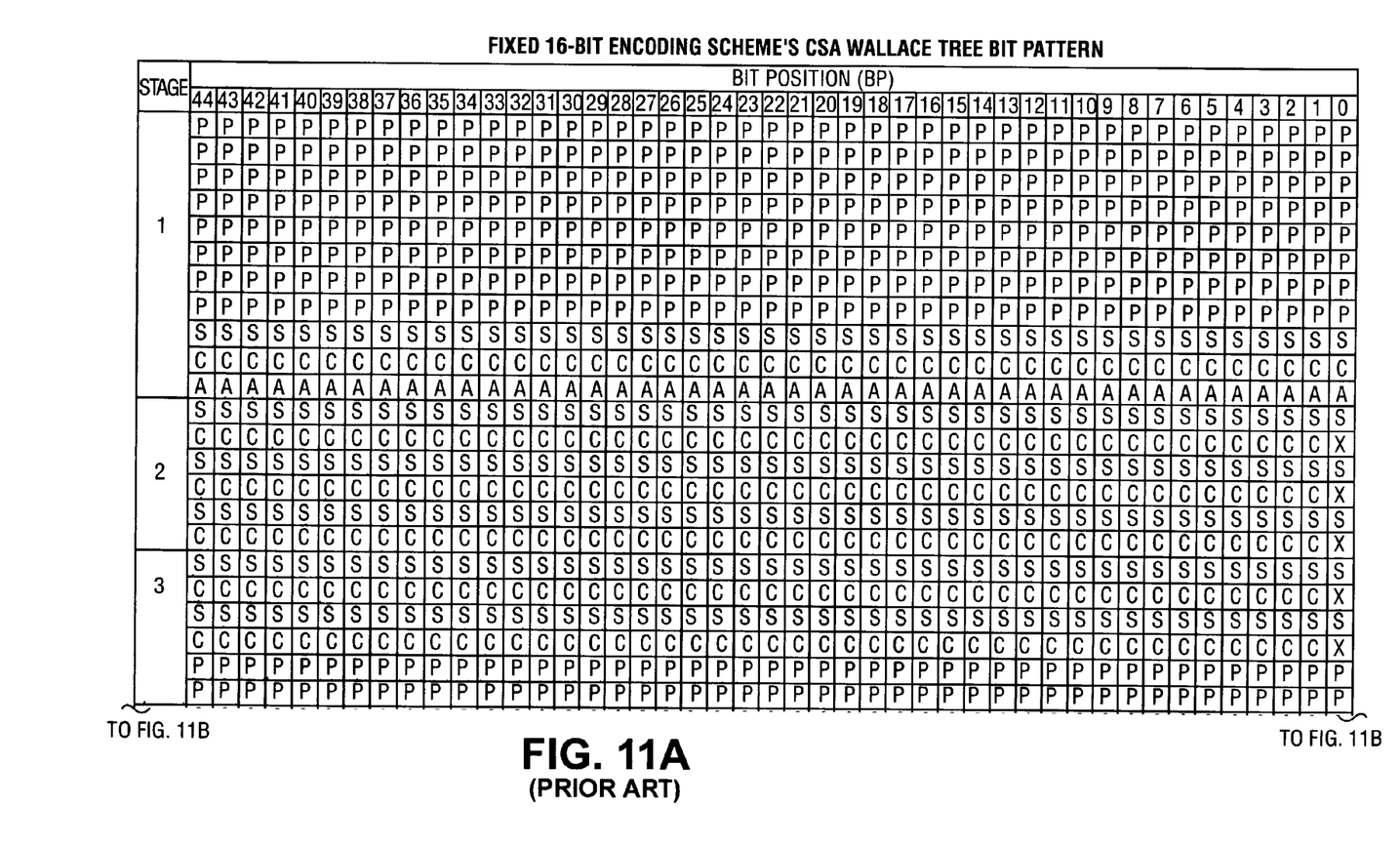
FIG. 11 illustrates a conventional fixed 16-b Wallace Tree bit pattern.
Figure 11B:
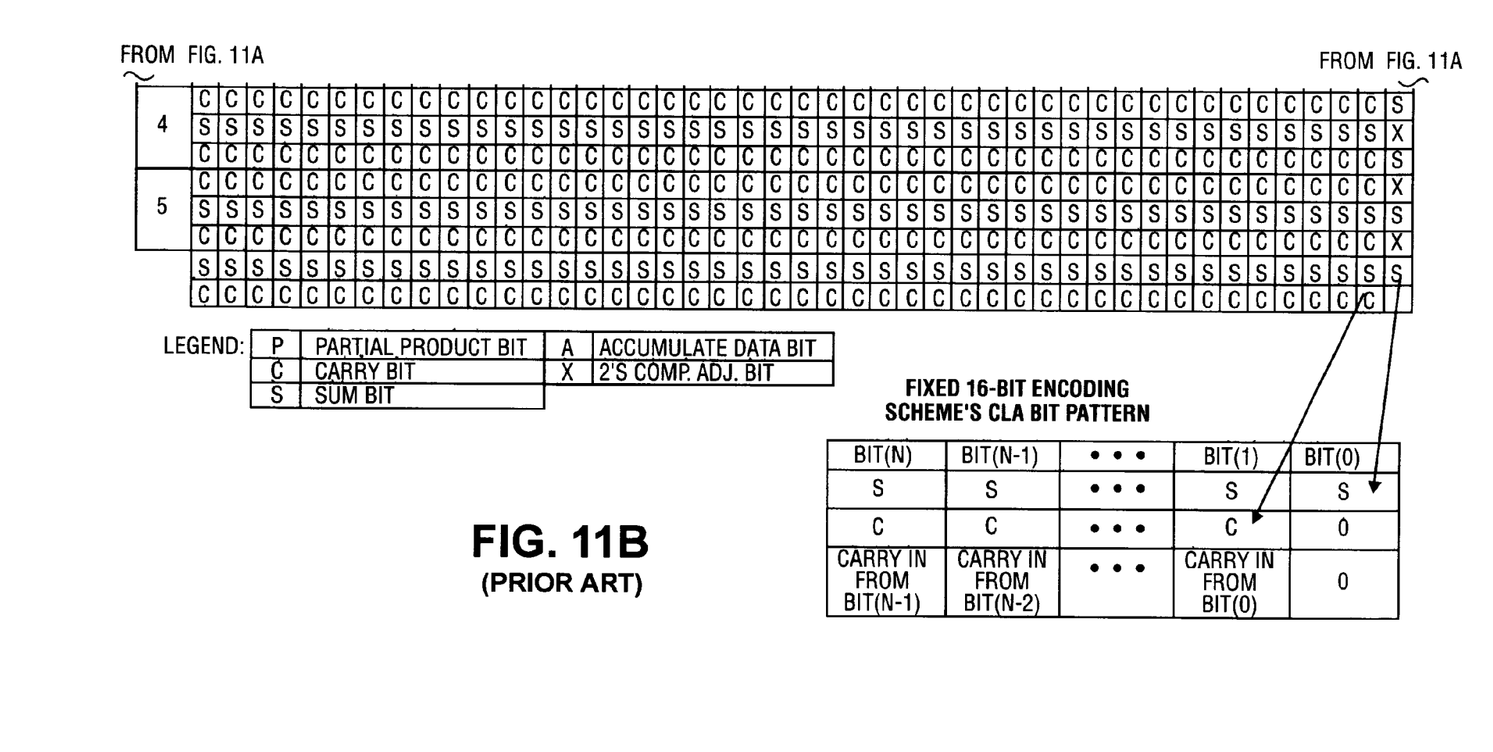
Figure 12:
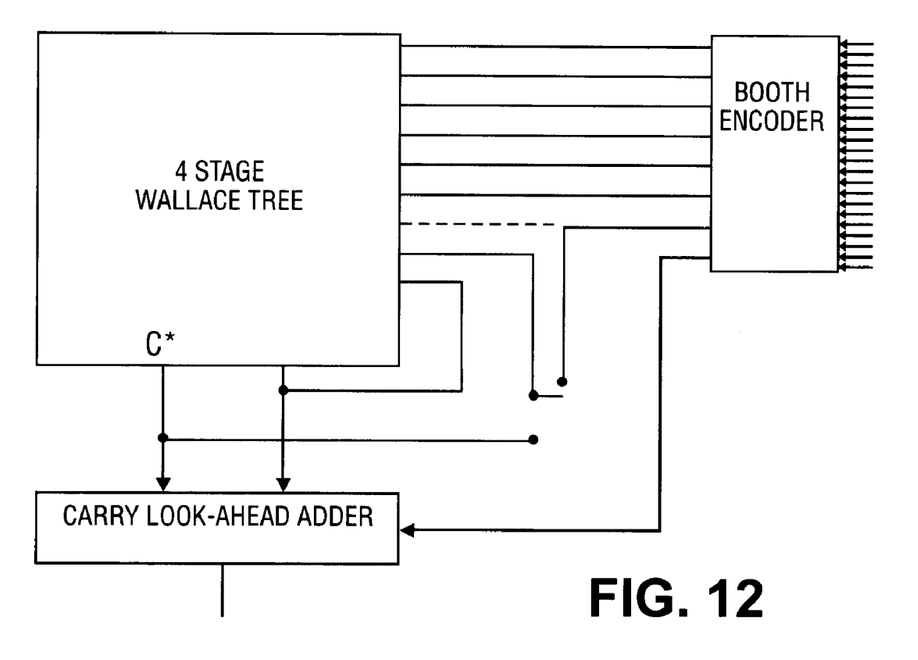
FIG. 12 illustrates an embodiment of the invention.
Figure 13A:
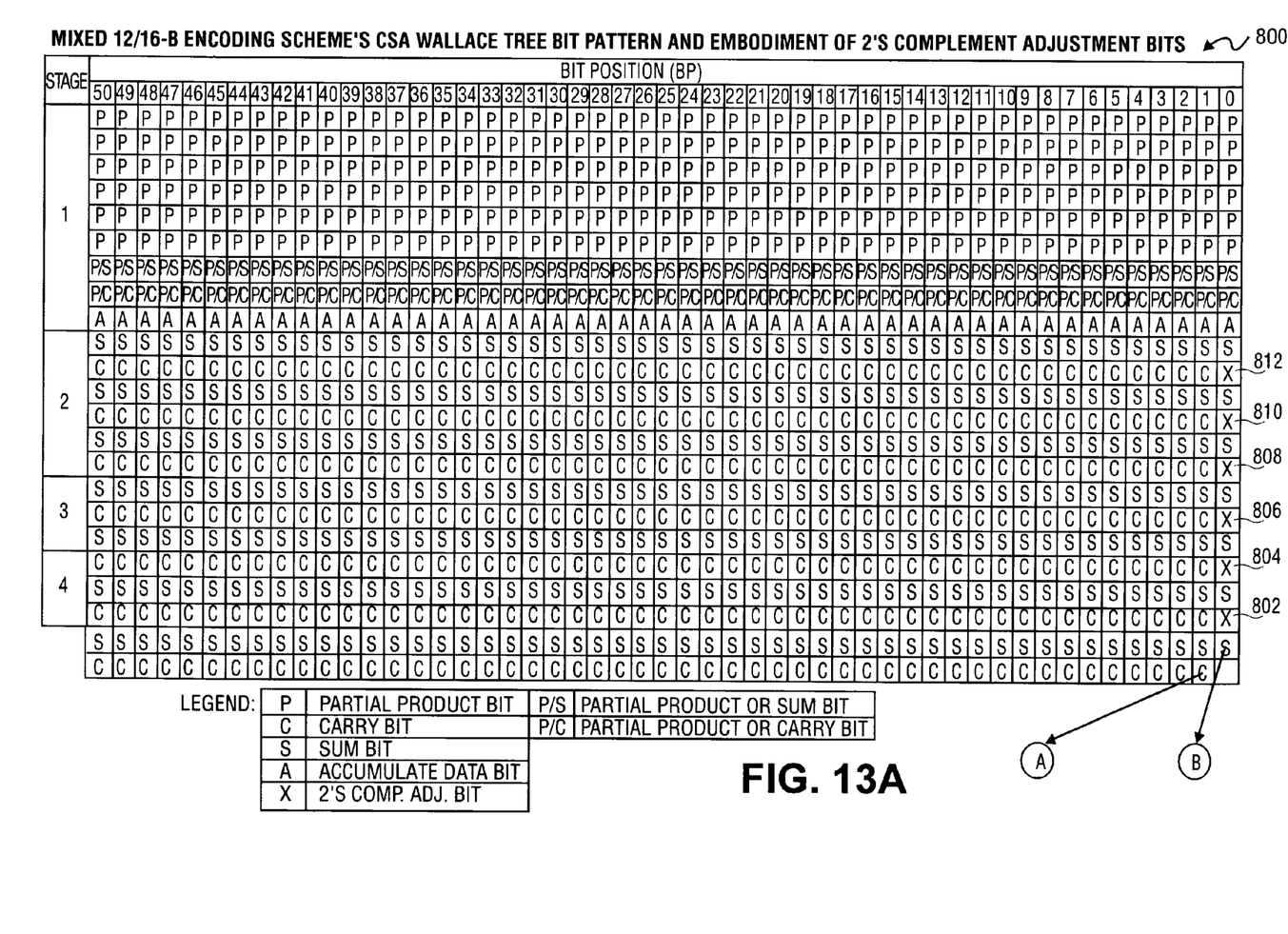
FIG. 13 illustrates a mixed 12/16-b encoding scheme for a CSA Wallace Tree bit pattern showing zeros and ones.
Figure 13B:
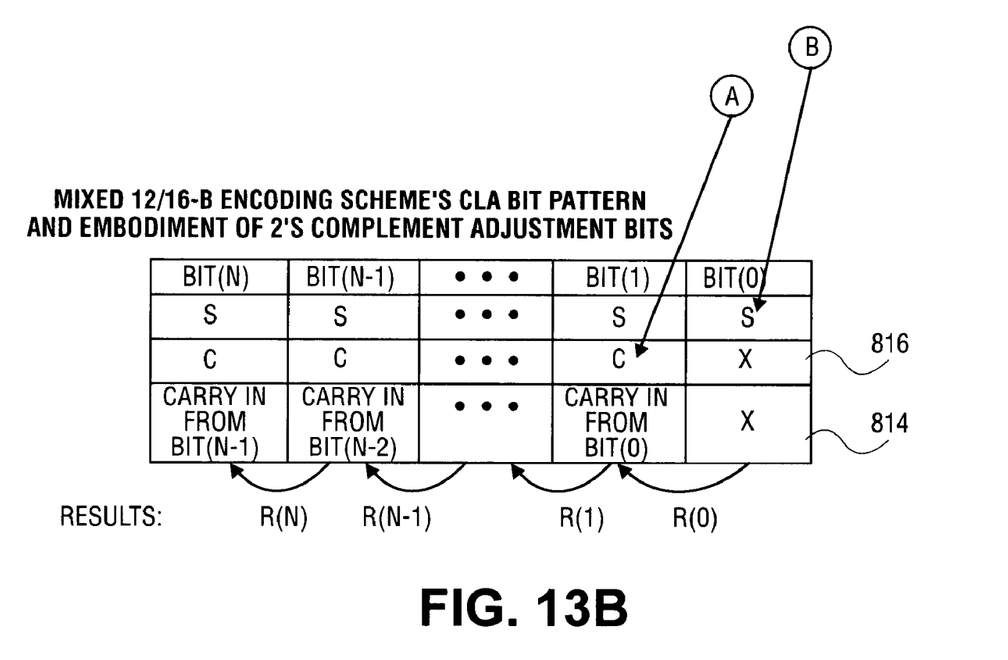

FIG. 11 illustrates a conventional fixed 16-b Wallace Tree bit pattern. FIG. 12 illustrates another embodiment of the invention showing how to insert eight twos compliment adjusting bits into a Wallace Tree and SLA. FIG. 13 also illustrates an encoding scheme for a CSA Wallace Tree bit pattern showing partial product bit, carry bit, and sum bit. As illustrated, the six bits, 802 through 812, are directed to the Wallace Tree and two bits (814, 816) are directed to column zero of the carry look ahead adder as a carry in input to the CLA. In other words, in the first one, it is position zero of the output carry vector. In the second, it is a carry into the carry look ahead adder. There may be a one-to-one correspondence. If eight partial products are generated, eight adjustment bits are generated. In other words, by generating eight partial products, eight adjustment bits are required to be input into the embodiment of the invention.

Figure 14:
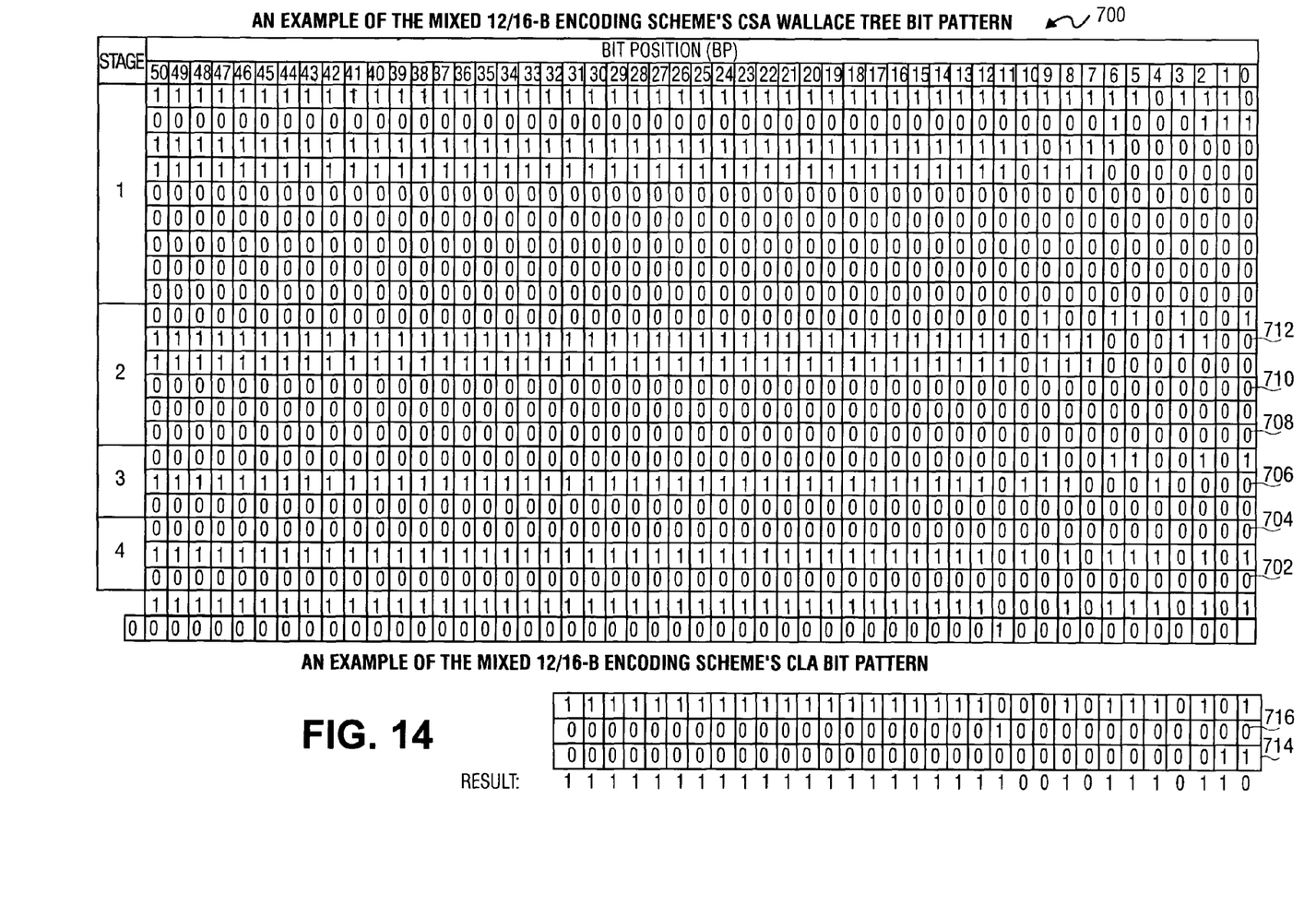
FIG. 14 illustrates an encoding scheme for a CSA Wallace Tree bit pattern showing zeros and ones.

FIG. 14 illustrates a mixed 12/16-b encoding scheme for a CSA Wallace Tree bit pattern showing zeros and ones. The seventh and eighth adjustment bits are 714 and 716, 714 is the carry in into the CLA and 716 is bit zero of the Wallace Tree carry output. In total, the Wallace Tree generates two's compliment fifty one bit vectors, a sum vector and a carry vector.

Several benefits are derived from the invention. For example, the encoding scheme allows the MAC embodiments to encode sixteen bits of the multiplier in the first cycle at very high speeds. The above DSP features meet the needs of various market segments and design requirements. The overall throughput of the MAC embodiments showed a dramatic increase over known MAC implementations, especially for 16-b signed DSP applications. For example, the use of a four stage Wallace Tree to process sixteen bits may be about 20% to 25% faster than using a five stage Wallace Tree to process sixteen bits as may be conventionally done.

The exemplary embodiments described herein are provided merely to illustrate the principles of the invention and should not be construed as limiting the scope of the subject matter of the terms of the claimed invention. The mixed length is not limited to 12-b mixed with 16-b, but can be any mixture that takes advantage of a high throughput encoding device coupled to a low latency, vector compression device. The invention may be placed in parallel multiplies, in a series or pipeline of multiplies, or a combination thereof. The principles of the invention may be applied toward a wide range of systems to achieve the advantages described herein and to achieve other advantages or to satisfy other objectives, as well.

What is claimed is:

1. A mixed length encoding unit comprising:
   a 16 bit Booth encoder adapted to produce partial products from the bits of data, the 16 bit Booth encoder having a plurality of partial product outputs;

a four state Wallace Tree adapted to compress the plurality of partial products, the four stage Wallace Tree having a plurality of inputs including a carry input and a sum input, a carry output and a sum output, wherein the four stage Wallace Tree is coupled to the 16 bit Booth encoder; and a multiplex system coupled to a first partial product output, the carry output, and the carry input, and further coupled to a second partial product output, the sum output, and the sum input.

2. The mixed length encoding unit of claim 1, wherein there are sixteen bits of data.

3. The mixed length encoding unit of claim 2, wherein the four stage Wallace Tree is a four stage CSA Wallace Tree.

4. The mixed length encoding unit of claim 3, wherein the four stage CSA Wallace Tree is a four stage, three to two CSA Wallace Tree.

5. A mixed length encoding unit comprising:

means for producing partial products from bits of data, the means for producing partial products having a plurality of partial product outputs, wherein the means for producing partial products has a throughput that is higher than the throughput for a 12 bit Booth encoder;

means for compressing the plurality of partial products, the means for compressing having a plurality of inputs including a carry input and a sum input, a carry output and a sum output, wherein the means for compressing is coupled to the means for producing partial products and has a latency that is lower than the latency of a five stage CSA Wallace Tree; and a multiplex system coupled to a first partial product output, the carry output, and the carry input, and further coupled to a second partial product output, the sum output, and the sum input.

6. The mixed length encoding unit of claim 5, wherein there are sixteen bits of data.

7. The mixed length encoding unit of claim 5 wherein the means for producing partial products is an encoder.

8. The mixed length encoding unit of claim 7 wherein the encoder is a Booth encoder.

9. The mixed length encoding unit of claim 8 wherein the Booth encoder is a 16 bit Booth encoder.

10. The mixed length encoding unit of claim 6, wherein the means for compressing is a Wallace Tree.

11. The mixed length encoding unit of claim 10, wherein the Wallace Tree is a four stage Wallace Tree.

12. The mixed length encoding unit of claim 11, wherein the four stage Wallace Tree is a four stage CSA Wallace Tree.

13. The mixed length encoding unit of claim 12, wherein the four stage CSA Wallace Tree is a four stage, three to two CSA Wallace Tree.

14. An apparatus comprising:

a power source;

a microprocessor coupled to the power source; and a multiply-accumulate unit disposed within the microprocessor, wherein the multiply-accumulate unit includes a mixed length 12/16 bit (12/16-b) encoding unit.

15. The apparatus of claim 14 wherein the mixed length encoding unit includes a 16-b Booth encoder adapted to produce partial products from bits of data, the 16-b Booth encoder having a plurality of partial product outputs, a four stage Wallace Tree adapted to compress the plurality of partial products, the four stage Wallace Tree having a plurality of inputs including a carry input and a sum input, a carry output and a sum output, wherein the four stage Wallace Tree is coupled to the 16-b Booth encoder, and a multiplex system coupled to a first partial product output, the carry output, and the carry input, and further coupled to a second partial product output, the sum output, and the sum input.

16. The apparatus of claim 15, wherein there are sixteen bits of data.

17. The apparatus of claim 16, wherein the four stage Wallace Tree is a four stage CSA Wallace Tree.

18. The apparatus of claim 17, wherein the four stage CSA Wallace Tree is a four stage, three to two CSA Wallace Tree, the unit further comprising:

a digital signal processing engine coupled to the power source and to the microprocessor.

19. A method of processing bits of data in a mixed length 12/16 bit encoding unit, comprising:

producing partial products in a 16 bit Booth encoder having a plurality of partial product outputs;

distributing the plurality of partial product outputs to a four stage Wallace Tree having a plurality of inputs including a carry input and a sum input, a carry output and a sum output, wherein the four stage Wallace Tree is coupled to the 16 bit Booth encoder; and compressing the plurality of partial products in the four stage Wallace Tree.

20. The method of claim 19 wherein producing partial products includes producing eight partial products and wherein a multiplex system is coupled to a first partial product output, the carry output, and the carry input, and further coupled to a second partial product output, the sum output, and the sum input, further comprises:

multiplexing the first partial product output to the carry input and multiplexing the second partial product output to the sum input, prior to distributing the plurality of partial product to the four stage Wallace Tree.

* * * * *